US010096293B2

(12) United States Patent
Du

(10) Patent No.: US 10,096,293 B2
(45) Date of Patent: Oct. 9, 2018

(54) GATE DRIVER AND LIQUID CRYSTAL DISPLAY

(71) Applicant: SHENZHEN CHINA STAR OPTOELECTRONICS TECHNOLOGY CO., LTD., Shenzhen, Guangdong (CN)

(72) Inventor: Peng Du, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 324 days.

(21) Appl. No.: 14/908,403

(22) PCT Filed: Jan. 11, 2016

(86) PCT No.: PCT/CN2016/070601
§ 371 (c)(1),
(2) Date: Jan. 28, 2016

(87) PCT Pub. No.: WO2017/113437
PCT Pub. Date: Jul. 6, 2017

(65) Prior Publication Data
US 2017/0256223 A1 Sep. 7, 2017

(30) Foreign Application Priority Data
Dec. 28, 2015 (CN) ......................... 201510999352.7

(51) Int. Cl.
*G06F 3/038* (2013.01)
*G09G 3/36* (2006.01)

(52) U.S. Cl.
CPC ......... *G09G 3/3677* (2013.01); *G09G 3/3648* (2013.01); *G09G 2300/0408* (2013.01); *G09G 2310/0213* (2013.01); *G09G 2310/08* (2013.01)

(58) Field of Classification Search
CPC ............... G09G 3/3677; G09G 3/3648; G09G 2300/0408; G09G 2310/0213; G09G 2310/08; G09G 3/3266
See application file for complete search history.

(56) References Cited

U.S. PATENT DOCUMENTS

2014/0125648 A1* 5/2014 Chung ................ G09G 3/3677 345/213
2015/0016584 A1* 1/2015 Dun ....................... G11C 27/04 377/68

FOREIGN PATENT DOCUMENTS

CN 104715707 A * 6/2015

* cited by examiner

*Primary Examiner* — Mark Edwards
(74) *Attorney, Agent, or Firm* — Hauptman Ham, LLP

(57) ABSTRACT

The present invention proposes a gate driver including a plurality of gate driver on array (GOA) units. Each of the GOA unit includes a main driving circuit, a starting signal output circuit, and a plurality of gate driving circuits. The gate driver utilizes a starting signal and two inversed clock signals to control the charging period and the discharging period of the gate driver. Furthermore, the gate driver utilizes multiple clock signals to control the output of the gate driving signals. In this way, the number of the clock signals is reduced and thus the power consumption is also reduced.

16 Claims, 6 Drawing Sheets

GATE DRIVER AND LIQUID CRYSTAL DISPLAY

FIELD OF THE INVENTION

The present invention relates to a gate driver of a liquid crystal display (LCD), and more particularly to a gate driver on array (GOA) circuit and an LCD.

BACKGROUND OF THE INVENTION

Gate driver on array (GOA) techniques have been widely used in LCD design. This structure not only saves the expenses of the gate driver chips, but also reduces the width of side frame of the LCD to allow a narrow side frame structure.

As the size and the resolution of the LCD increase, the clock signals (CK) for the GOA circuits become various. In general, a high definition (HD) panel (e.g., the resolution is 1280*720) uses 4 clock signals in the GOA circuits. Furthermore, a full high definition (FHD) panel utilizes 6 or 8 clock signals. The clock signal is a high-frequency signal in which a high voltage level and a low voltage level switch frequently. However, the power consumption of the gate driver is related to the power consumptions of transistors caused by crossing currents passing through the transistors. In addition, the power consumption of the transistors is proportional to the squared switching frequency of the clock signal. Therefore, if the number of the clock signal is larger or the frequency of the clock signal is higher, the power consumption of the gate driver is significant.

Please refer to FIG. 1. The GOA circuit 100 comprises 4 transistors and 1 capacitor. The GOA circuit of current stage outputs a gate driving signal G(n) and provides an intermediate signal, which is a starting signal ST(n), to a GOA circuit of next stage. The GOA circuit 100 comprises a main driving circuit 120 and an output circuit 150. The main driving circuit 120 comprises a transistor T1 and a transistor T2. The transistor T1 is turned on in response to a starting signal ST (n−2). The transistor T2 is turned on to transmit the voltage source Vss to reset the signal Q(n) in response to a gate driving signal G(n+2) being received.

The output circuit 150 comprises a transistor T2, a transistor T4, and a transistor T8. The transistor T4 is turned on in response to signal Q(n). When the transistor T4 is turned on, the clock signal CK is transferred to the source and thus the gate driving signal G(n) is outputted. In addition, the transistor T8 is turned on in response to a gate driving signal G(n+2) and thus the voltage source Vss is transferred through the transistor T8 to reset the gate driving signal G(n).

Because of the reliability of amorphous silicon, a pull-down circuit 15 needs to be additionally provided. The pull-down circuit 15 is used to ensure the voltage levels of the node Q and the output node of the GOA circuit when the GOA circuit is in a deactivation state. In other words, the pull-down circuit 15 is able to pull down the voltage levels of the node Q and the output node and thus raise the reliability of the GOA circuit 100.

GOA circuit of a large-size high-definition display often adopts multiple clock signals, such as 6 or 8 clock signals, to ensure the reliability. Please refer to FIG. 2, which is a diagram of a conventional two-stage GOA circuit driven by 6 different phases. In FIG. 2, the first stage 210 of the GOA circuit generates three gate driving signals G(N), G(N+1), and G(N+2) in response to two gate driving signals G(N−1) and G(N+5) and six input clock signals CK1, CK2, CK3, XCK1, XCK2, and XCK3.

Please refer to FIG. 3, which is a timing diagram corresponding to operations of the GOA circuit. As shown in FIG. 3, the accumulated width of the gate driving signals G(N)-G(N+5) and the clock signals CK1-CK3 and XCK1-XCK3 is 3W. W is a time period of charging a single scan line. The power is mainly consumed due to the clock signals. In general, the power consumption is proportional to the voltage of the clock signals squared. Therefore, if the number of the clock signals is larger, the power consumption is more significant. This problem becomes more severe when the resolution of the display is higher. Furthermore, the large number of the clock signals also increases the cost of the driving circuit and thus reduces its competitiveness.

Therefore, a new structure of GOA is required to solve the above-mentioned problem of a large number of clock signals and huge power consumption. This new structure may reduce the number of clock signals and reduce the power consumption of the GOA circuit to meet the demands of green products.

SUMMARY OF THE INVENTION

One objective of exemplary embodiments of the present disclosure is to provide a gate driver. The gate driver utilizes an intermediate signal (starting signal) and two inversed clock signals to control the charging period and the discharging period of the gate driver. Furthermore, the gate driver utilizes multiple clock signals to control the output of the gate driving signals. In this way, the number of the clock signals is reduced and thus the power consumption is also reduced.

One objective of the exemplary embodiments is to provide a gate driver. The gate driver utilizes an intermediate signal (starting signal) and two inversed clock signals to control the voltage level of the node Q. Furthermore, the gate driver utilizes multiple clock signals to control the output of the gate driving signals. In this way, the number of the clock signals is reduced and thus the power consumption of the GOA circuit is also reduced.

According to an aspect of the exemplary embodiments, this is provided a gate driver. The gate driver includes a plurality of gate driver on array (GOA) units. Each of the GOA unit includes a main driving circuit, a starting signal output circuit, and a plurality of gate driving circuits. The main driving circuit includes a first transistor, a second transistor, and a third transistor. The source of the first transistor is configured to receive a starting signal and the gate of the first transistor is configured to receive a first triggering clock signal. The gate of the second transistor is configured to receive a second triggering clock signal. The main driving circuit has a first control node and a second control node and is configured to generate a charging signal on the first control node and generate a control signal on the second control node in response to the starting signal, the first triggering clock signal and the second clock signal. The starting signal output circuit includes a fourth transistor receiving the charging signal to output an intermediate signal and a fifth transistor receiving the control signal to deactivate the intermediate signal. Each of the gate driving circuit includes a sixth transistor receiving the charging signal to output a gate driving signal and a seventh transistor receiving the control signal to deactivate the gate driving signal.

According to another aspect of the exemplary embodiments, the starting signal is another intermediate signal transferred from a GOA unit of a previous stage or a starting signal provided by a gate driving control chip.

According to another aspect of the exemplary embodiments, the first triggering clock signal and the second triggering clock signal are inversed.

According to another aspect of the exemplary embodiments, the main driving circuit further comprises an eighth transistor, a ninth transistor, and a tenth transistor, and wherein when the first transistor is turned on by the first triggering clock signal, the eighth transistor, the ninth transistor, and the tenth transistor are turned on such that the charging signal is generated on the first control node and the control signal is generated on the second control node.

According to another aspect of the exemplary embodiments, each of the sixth transistors of the gate driving circuits comprises a source, a drain, and a gate, wherein the sources of the sixth transistors are respectively electrically connected to different clock signals, the gates are electrically connected to the charging signal, and wherein the drains of the sixth transistors sequentially output a gate driving signal when the sixth transistors are turned on in response to the clock signals.

According to another aspect of the exemplary embodiments, each of the seventh transistors of the gate driving circuits comprises a source, a drain, and a gate, wherein the sources of the seventh transistors are respectively electrically connected to the drains of the sixth transistors, the drains of the seventh transistors are electrically connected to a voltage source, the gates of the seventh transistors receive the control signal, and wherein the seventh transistors deactivate the gate driving signals by conducting the first voltage source when the seventh transistors are turned on in response to the control signal.

According to another aspect of the exemplary embodiments, the fourth transistor of the starting signal output circuit comprises a source, a drain, and a gate, wherein the source of the fourth transistor is electrically connected to the second triggering clock signal, the gate of the fourth transistor receives the charging signal, and wherein when the fourth transistor is turned on by the second triggering clock signal, the drain of the fourth transistor outputs the starting signal.

According to another aspect of the exemplary embodiments, the fifth transistor of the starting signal output circuit comprises a source, a drain, and a gate, wherein the source of the fifth transistor is electrically connected to the drain of the fourth transistor, the drain of the fifth transistor is electrically connected to the first voltage source, and the gate of the fifth transistor receives the control signal, and wherein when the fifth transistor is turned on by control signal, the fifth transistor deactivate the starting signal by conducting the first voltage source.

According to another aspect of the exemplary embodiments, each of the GOA unit comprises a sequential-scan transistor and a reversed-scan transistor, respectively configured to receive a sequential-scan control signal and a reversed-scan control signal to control the GOA unit to operate in a sequential-scan mode or a reversed-scan mode.

According to another aspect of the exemplary embodiments, a liquid crystal display comprises a gate driver. The gate driver includes a plurality of gate driver on array (GOA) units. Each of the GOA unit includes a main driving circuit, a starting signal output circuit, and a plurality of gate driving circuits. The main driving circuit includes a first transistor, a second transistor, and a third transistor. The source of the first transistor is configured to receive a starting signal and the gate of the first transistor is configured to receive a first triggering clock signal. The gate of the second transistor is configured to receive a second triggering clock signal. The main driving circuit has a first control node and a second control node and is configured to generate a charging signal on the first control node and generate a control signal on the second control node in response to the starting signal, the first triggering clock signal and the second clock signal. The starting signal output circuit includes a fourth transistor receiving the charging signal to output an intermediate signal and a fifth transistor receiving the control signal to deactivate the intermediate signal. Each of the gate driving circuit includes a sixth transistor receiving the charging signal to output a gate driving signal and a seventh transistor receiving the control signal to deactivate the gate driving signal.

According to another aspect of the exemplary embodiments, the starting signal is another intermediate signal transferred from a GOA unit of a previous stage or a starting signal provided by a gate driving control chip.

According to another aspect of the exemplary embodiments, the first triggering clock signal and the second triggering clock signal are inversed.

According to another aspect of the exemplary embodiments, the main driving circuit further comprises an eighth transistor, a ninth transistor, and a tenth transistor, and wherein when the first transistor is turned on by the first triggering clock signal, the eighth transistor, the ninth transistor, and the tenth transistor are turned on such that the charging signal is generated on the first control node and the control signal is generated on the second control node.

According to another aspect of the exemplary embodiments, each of the sixth transistors of the gate driving circuits comprises a source, a drain, and a gate, wherein the sources of the sixth transistors are respectively electrically connected to different clock signals, the gates are electrically connected to the charging signal, and wherein the drains of the sixth transistors sequentially output a gate driving signal when the sixth transistors are turned on in response to the clock signals.

According to another aspect of the exemplary embodiments, each of the seventh transistors of the gate driving circuits comprises a source, a drain, and a gate, wherein the sources of the seventh transistors are respectively electrically connected to the drains of the sixth transistors, the drains of the seventh transistors are electrically connected to a voltage source, the gates of the seventh transistors receive the control signal, and wherein the seventh transistors deactivate the gate driving signals by conducting the first voltage source when the seventh transistors are turned on in response to the control signal.

According to another aspect of the exemplary embodiments, the fourth transistor of the starting signal output circuit comprises a source, a drain, and a gate, wherein the source of the fourth transistor is electrically connected to the second triggering clock signal, the gate of the fourth transistor receives the charging signal, and wherein when the fourth transistor is turned on by the second triggering clock signal, the drain of the fourth transistor outputs the starting signal.

According to another aspect of the exemplary embodiments, the fifth transistor of the starting signal output circuit comprises a source, a drain, and a gate, wherein the source of the fifth transistor is electrically connected to the drain of the fourth transistor, the drain of the fifth transistor is electrically connected to the first voltage source, and the gate of the fifth transistor receives the control signal, and wherein when the fifth transistor is turned on by control signal, the fifth transistor deactivate the starting signal by conducting the first voltage source.

According to another aspect of the exemplary embodiments, each of the GOA unit comprises a sequential-scan transistor and a reversed-scan transistor, respectively configured to receive a sequential-scan control signal and a reversed-scan control signal to control the GOA unit to operate in a sequential-scan mode or a reversed-scan mode.

According to another aspect of the exemplary embodiments, the transistors can be P-channel metal oxide semiconductor (PMOS) transistors or N-channel metal oxide semiconductor (NMOS).

In contrast to the prior art, which needs to utilize 6 or 8 clock signals, the present disclosure utilizes two inversed clock signals and the starting signal to control the charging time and discharging time of the GOA circuit. Furthermore, the present disclosure utilizes 3 or 4 addition clock signals to control the output of the gate driving signals. Therefore, the present invention merely utilizes 5 or 6 clock signals to achieve the same effect of a conventional GOA circuit. In other words, the present disclosure may reduce the number of clock signals used in the gate driver and reduce the power consumption of the GOA circuit.

These and other features, aspects and advantages of the present disclosure will become understood with reference to the following description, appended claims and accompanying figures.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
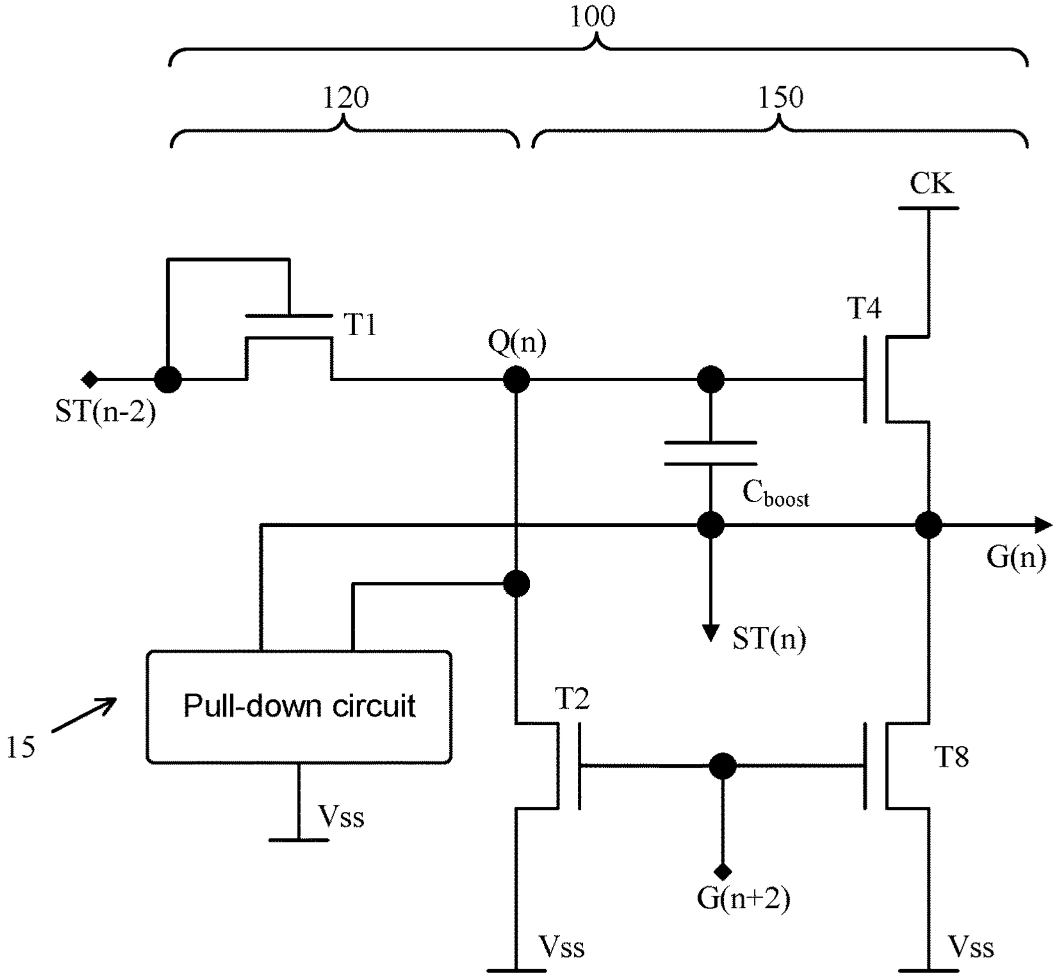
Fig. 1 (Prior art)
FIG. 1 is a diagram of a conventional single-state GOA circuit.
Figure 2:
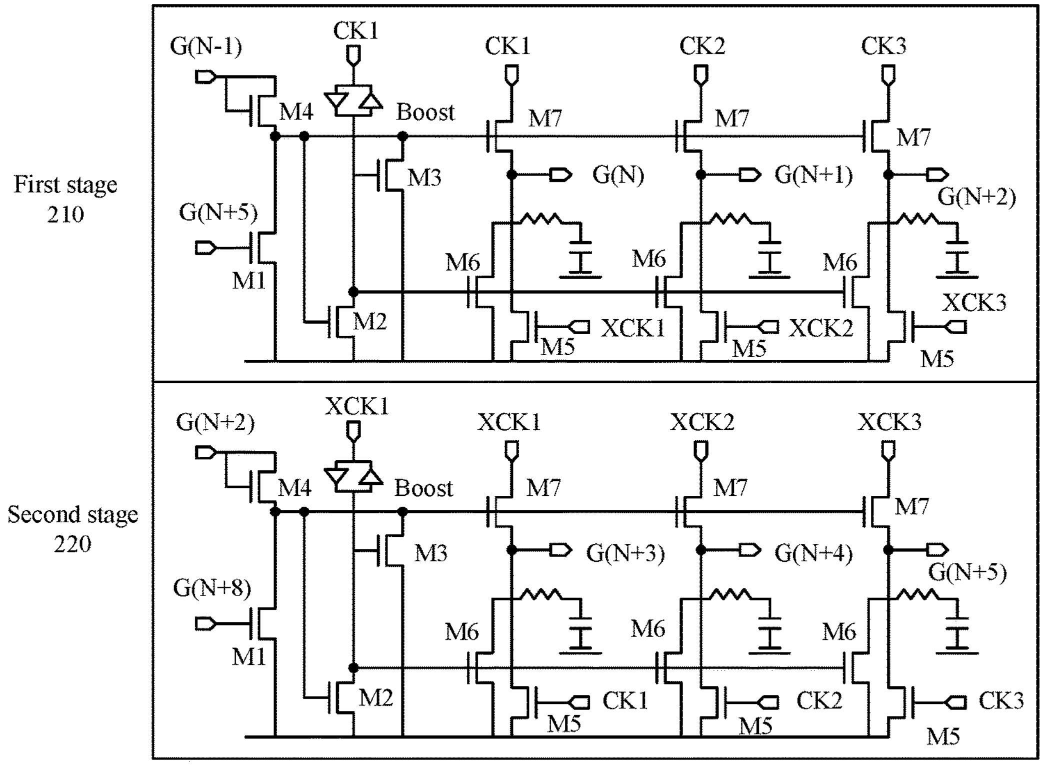
Fig. 2 (Prior art)
FIG. 2 is a diagram of a conventional two-stage GOA circuit driven by six clock signals.
Figure 3:
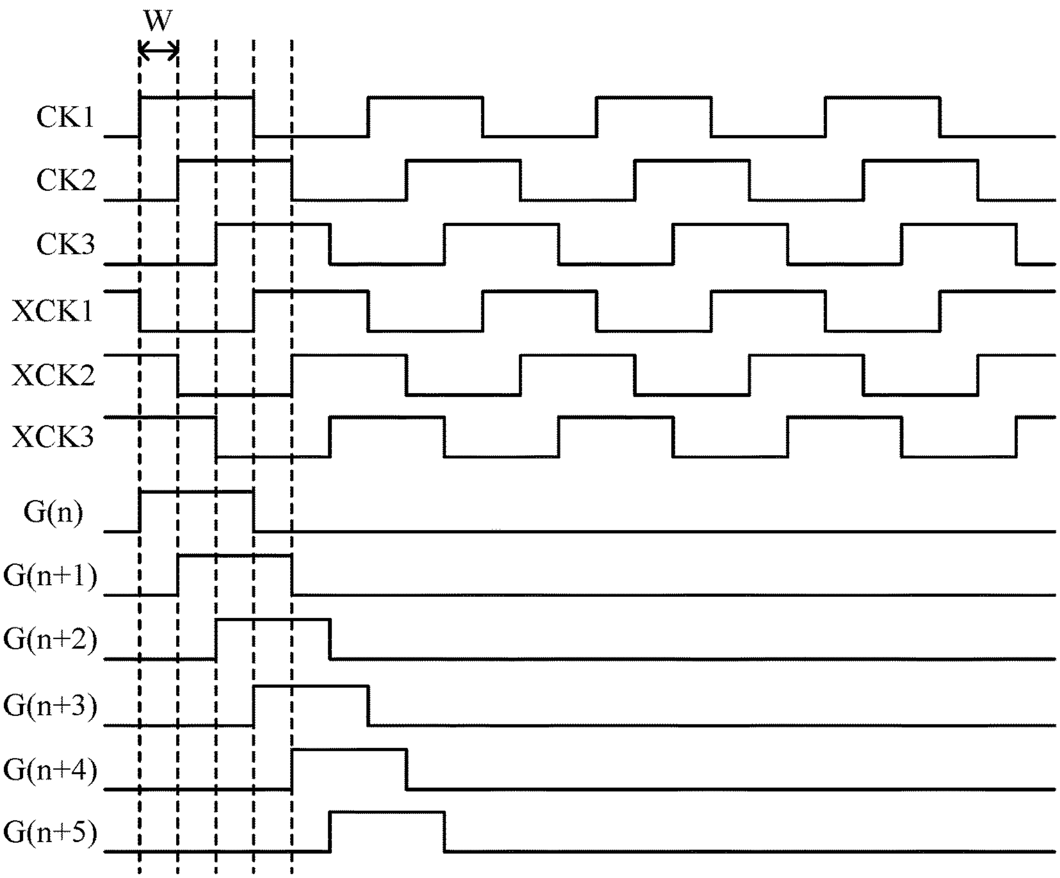
Fig. 3 (Prior art)
FIG. 3 is a timing diagram corresponding to operations of the GOA circuit shown in FIG. 2.
Figure 4:
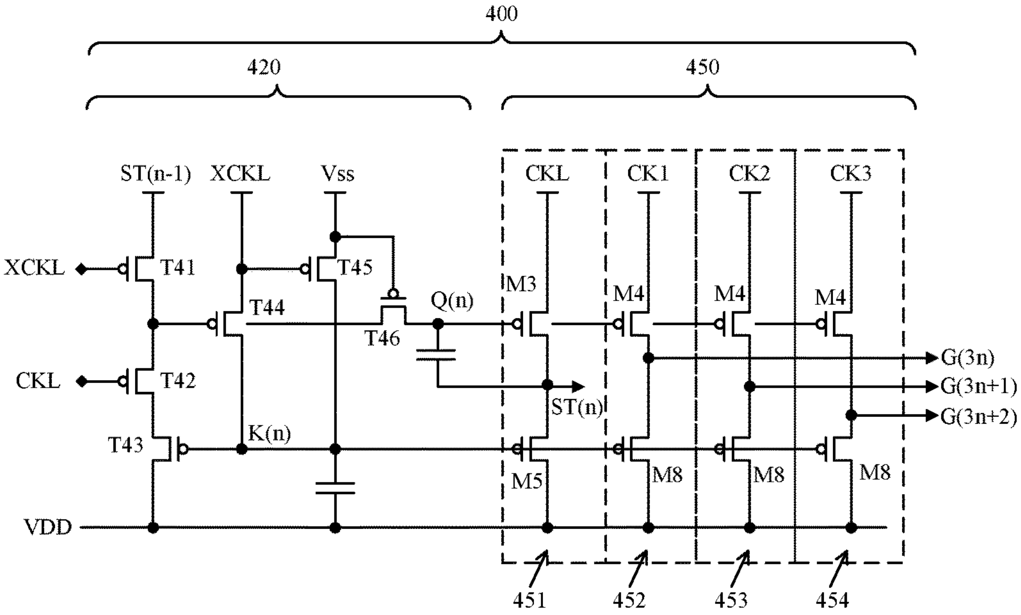
FIG. 4 is a diagram of a single-stage GOA circuit of a first exemplary embodiment.

FIG. 4 is a diagram of a single-stage GOA circuit 400 of a first exemplary embodiment of the present disclosure. In this exemplary embodiment, P-channel metal oxide semiconductor (PMOS) transistors are used to realize the single-stage GOA circuit 400 and the entire circuit requires five clock signals. The five clock signals includes a first triggering clock signal XCKL and a second triggering clock signal CKL. In addition, the five clock signals further include three clock signals CK1, CK2 and CK3 for control the output of the gate driving signals. The first triggering clock signal XCKL and the second triggering clock signal CKL are inversed. Furthermore, Vss and VDD respectively represent a low voltage source and a high voltage source. ST(n−1) represents a starting signal transferred from a previous stage of GOA circuit or could be called as an intermediate signal. Here, if the GOA circuit 400 is the first stage of GOA circuit, a starting signal STV, which is provided by a scan driving chip or a timing controller chip, is inputted to the GOA circuit 400 instead of ST(n−1).

Figure 5:
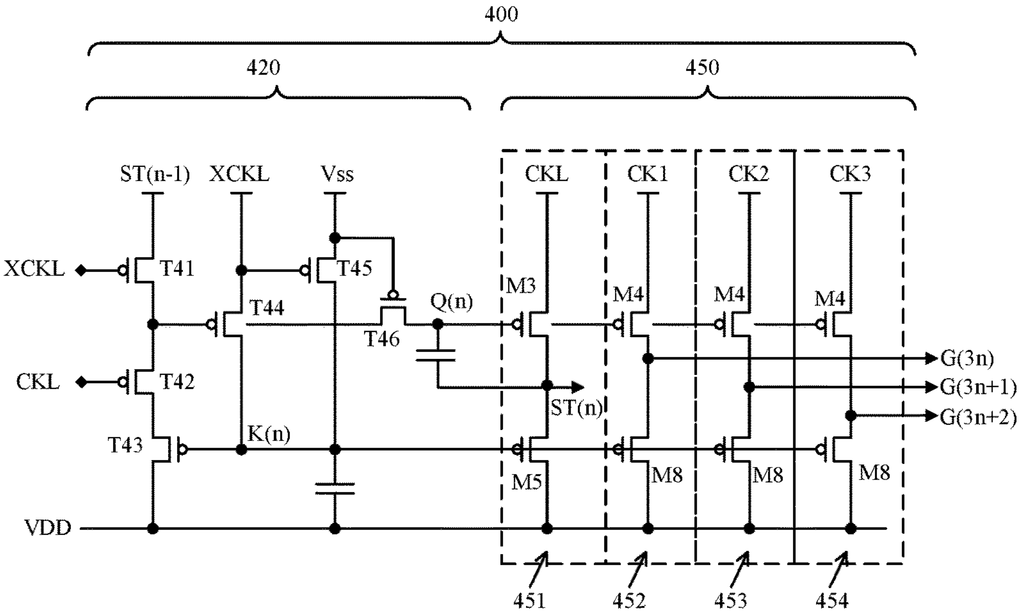
FIG. 5 is a timing diagram corresponding to operations of the GOA circuit shown in FIG. 4.

FIG. 5 is a timing diagram of operations of the GOA circuit shown in FIG. 4. As shown in FIG. 5, the waveforms of the clock signals CK1-CK3 do not have an overlap in the low-voltage portion. In addition, the frequency of each of the clock signals CK1-CK3 is double of the frequency of the first triggering clock signal XCKL or the second triggering clock signal CKL. The frequency of the first triggering clock signal XCKL is the same as that of the second triggering clock signal CKL. However, the first triggering clock signal XCKL and the second triggering clock signal CKL are inversed (which means they have inversed phases).

Please refer to FIG. 4 in conjunction with FIG. 5. The correspondences among the gate driving signals, the first triggering clock signal XCKL, the second triggering clock signal CKL and the clock signals CK1-CK3 can be understood from FIG. 4 and FIG. 5. The operations of the GOA circuit 400 are illustrated as follows:

As shown in FIG. 4, the GOA circuit 400 comprises a main driving circuit 420 and an output circuit 450. The main driving circuit 420 comprises a first transistor T41, a second transistor T42, a third transistor T43, an eighth transistor T44, a ninth transistor T45, and a tenth transistor T46. The source of the transistor T41 receives a starting signal ST(n−1) from another GOA circuit of a previous stage. As previously mentioned, if the GOA circuit 400 is the first stage, the transistor T41 receives a starting signal STV. After receiving the starting signal, the node Q is charged to generate a charging signal Q(n). The gate of the transistor T42 receives the second triggering clock signal CKL and the gate of the transistor T41 receives the first triggering clock signal XCKL to control the voltage level of the node Q in cooperation with the intermediate (starting) signal ST(n−1).

As shown in FIG. 4, the output circuit 450 comprises a starting signal output circuit 451 and three gate driving circuits 452, 453 and 454. The starting signal output circuit 451 receives the charging signal Q(n) of the node Q to output the starting signal ST(n) and further receives a control signal K(n) from the node K to deactivate the starting signal. The output circuit 450 comprises a source to receive the second triggering clock signal CKL and three other sources to receive the clock signals CK1-CK3.

Specifically, the transistor T41 comprises a source, drain, and a gate. The source receives the starting signal ST(n−1) from a previous stage and the gate receives the first triggering clock signal XCKL. The charging period of the GOA circuit 400 is a time period when the starting ST(n−1) and the first triggering clock signal XCKL are both in a low voltage level. In this time period, the transistor T41 is turned on and the drain of the transistor T41 is in a low voltage level such that the transistors T44, T45 and T46 are sequentially turned on. In this way, the node Q is charged to a low voltage level and thus the charging signal Q(n) is established.

The source of the transistor T42 is electrically connected to the drain of the transistor T41. The drain of the transistor T42 is electrically connected to the source of the transistor T43. The gate of the transistor T42 is electrically connected to the second triggering clock signal CKL. The drain of the transistor T43 is electrically connected to a voltage source VDD. The gate of the transistor T43 is electrically connected to the node K. At this time, the node K may be charged to generate a control signal K(n). The control signal K(n) turns on the transistor T43 and thus the drain of the transistor T43 is electrically connected to the voltage source VDD such that the node K and the node Q have different voltage levels.

When the first triggering clock signal XCKL corresponds to a high voltage level and the second triggering clock signal CKL corresponds to a low voltage level, the GOA circuit 400 is switched into a discharging period. In this time period, the voltage level of the node Q goes down such that the transistor T42 is turned off. In addition, the transistor T42 is turned on by the second triggering clock signal CKL and the voltage source VDD is electrically connected to the source of the transistor T42 through the transistor T43 (as previously mentioned, the transistor T43 is also turned on).

As shown in FIG. 4, the starting signal output circuit 451 comprises a fourth transistor M3 and a fifth transistor M5. The source of the fourth transistor M3 receives the second triggering clock signal CKL and the gate receives the charging signal Q(n). When the fourth transistor M3 is turned on by the second triggering clock signal CKL, the drain of the fourth transistor M3 generates a starting signal ST(n), the above-mentioned intermediate signal, for a next stage.

The fifth transistor M5 of the starting signal output circuit 451 comprises a source, a drain, and a gate. The source of the fifth transistor M5 is electrically connected to the drain of the fourth transistor M3, the drain of the fifth transistor M5 is electrically connected to the voltage source VDD, and the gate of the fifth transistor M5 is electrically connected to the node K. When the fourth transistor M3 is turned on, the fifth transistor M5 is turned off. In addition, when the fifth transistor M5 is turned on by the control signal K(n), the drain of the fifth transistor M5 is electrically connected to the voltage source VDD and the starting signal ST(n) is deactivated.

Each of the gate driving circuits 452, 453 and 454 comprises a sixth transistor M6 and a seventh transistor M8. The sixth transistor M6 of each of the gate driving circuits 452, 453 and 454 comprises a source, a drain, and a gate. When the GOA circuit 400 is in the charging period, the sixth transistor M6 is turned on by the charging signal Q(n). The sources of the sixth transistors M6 respectively receive the clock signals CK1-CK3 and the gate driving signals G(3n), G(3n+1) and G(3n+2) are sequentially generated at the drains of the sixth transistors M6 according to the timing of the clock signals CK1-CK3.

The seventh transistor M8 of each of the gate driving circuits 452, 453 and 454 comprises a source, a drain, and a gate. The sources of the seventh transistors M8 are respectively electrically connected to the drains of the sixth transistors M6 of the gate driving circuits 452, 453 and 454. The drains of the seventh transistors M8 are all electrically connected to the voltage source VDD. The gates of the seventh transistors M8 are all electrically connected to the node K. When the sixth transistors M4 of the gate driving circuits 452, 453 and 454 are turned on, the seventh transistors M8 are turned off such that the gate driving signals G(3n), G(3n+1) and G(3n+2) are not affected.

When the seventh transistors M8 of the gate driving circuits 452, 453 and 454 are turned on by the control signal K(n), the sixth transistors M4 of the gate driving circuits 452, 453 and 454 are turned off and thus the drains of the seventh transistors M8 are electrically connected to the voltage source VDD such that the gate driving signals G(3n), G(3n+1) and G(3n+2) are deactivated.

Figure 6:
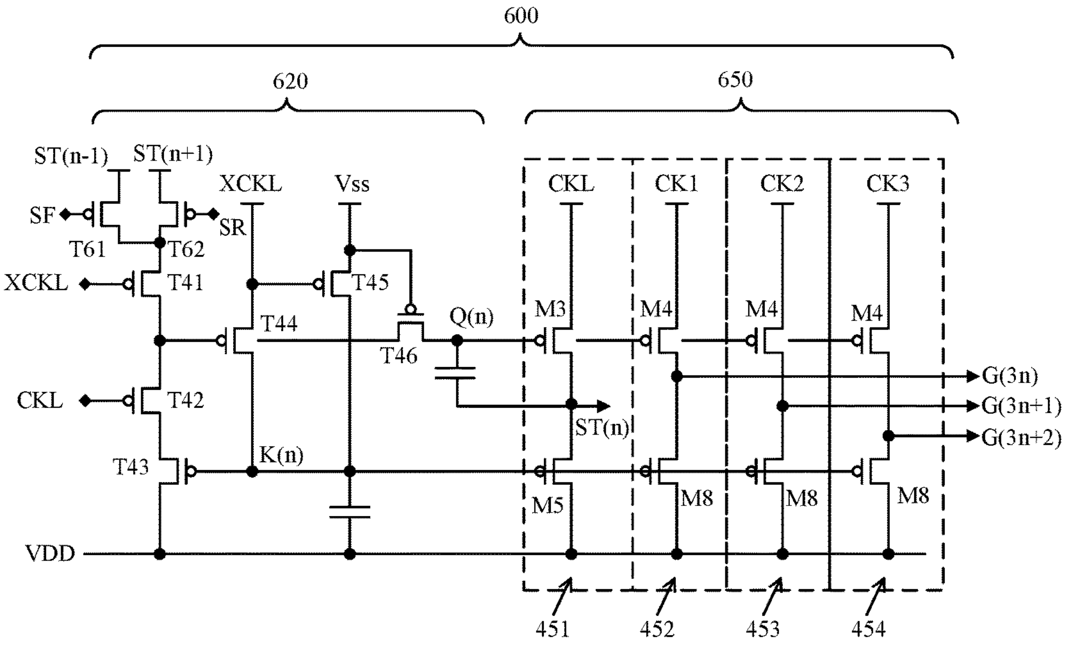
FIG. 6 is a diagram of a single-stage GOA circuit of a second exemplary embodiment.

FIG. 6 is a diagram of a single-stage GOA circuit according to a second exemplary embodiment. In response to various scanning formats of the display device, a sequential scan function and a reversed scan function are included in the second exemplary embodiment. In the GOA circuit 600 shown in FIG. 6, two signals SF and SR are introduced to control the scanning directions. The signals SF and SR are both direct-current (DC) signals. In general, when one of the signals SF and SR is in a low voltage level, the other one of the signals SF and SR is in a high voltage level. In addition, when the signal SF is in a low voltage level and the signal SR is in a high voltage level, the GOA circuit is in a sequential scan mode, which means that the gate lines are sequentially driven through an increasing number of the stages of the GOA circuits (e.g., through stage 1, stage 2, stage 3, . . . , stage n). On the other hand, when the signal SF is in a high voltage level and the signal SR is in a low voltage level, the GOA circuit is in a reversed scan mode, which means that the gate lines are sequentially driven through an decreasing number of the stages of the GOA circuits (e.g., through stage n, stage n−1, stage n−2, . . . , stage 1).

Figure 7:
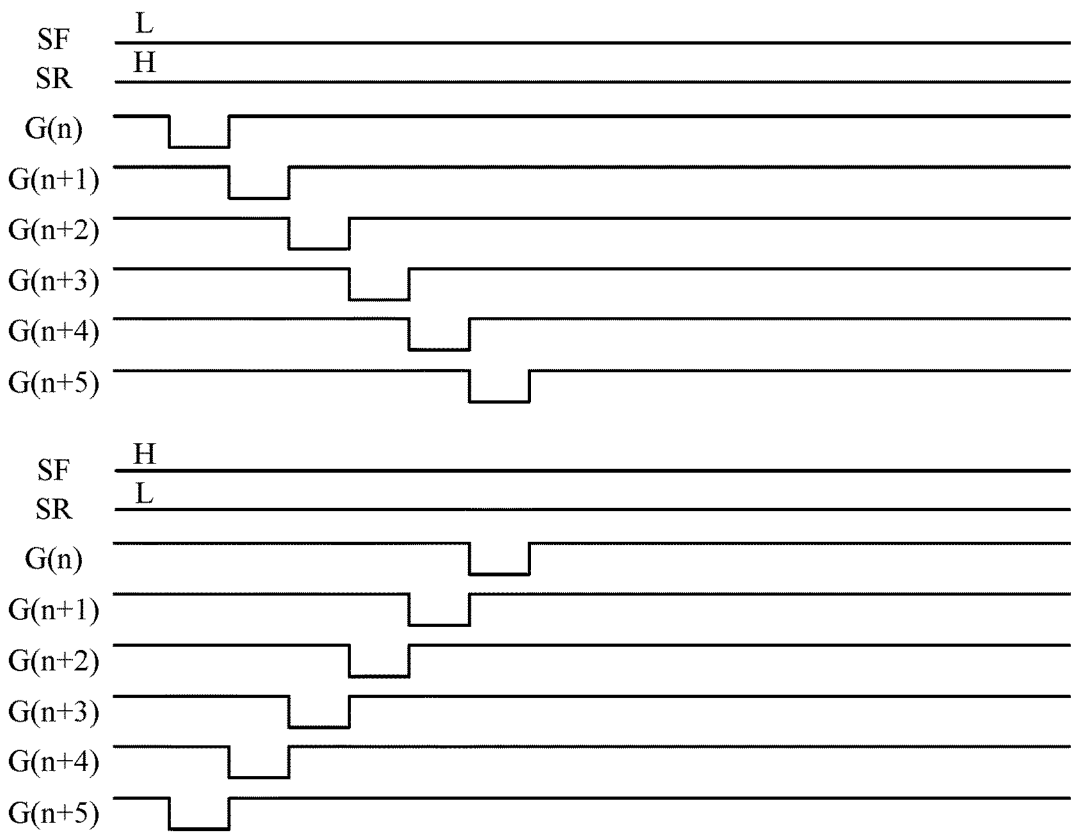
FIG. 7 is a timing diagram corresponding to operations of the GOA circuit shown in FIG. 6.

FIG. 7 is a timing diagram illustrating different scanning modes of the GOA circuit shown in FIG. 6. Please refer to FIG. 7 in conjunction with FIG. 6. From FIG. 7, the timing correspondences among the signals SF and SR, the gate driving signals, the first triggering clock signal XCKL, the second triggering clock signal CKL and the clock signals CK1-CK3 can be understood. The operations of the GOA circuit 600 of the second exemplary embodiment are illustrated as follows:

In the basis of the first exemplary embodiment, the GOA circuit 600 comprises a main driving circuit 620 and an output circuit 650. The main driving circuit 620 comprises the same six transistors as the first exemplary embodiment. In addition, the GOA circuit 620 further comprises a sequential-scan transistor T61 and a reversed-scan transistor T62 respectively receiving the scanning direction control signals SF and SR. In addition, the source of the transistor T61 receives a starting signal ST(n−1) from a previous stage and the source of the transistor T62 receives a starting signal ST(n+1) from a next stage. In this way, the GOA circuit 600 is controlled to operate in a sequential scan mode or a reversed scan mode. The other operations of the GOA circuit 600 have been illustrated in the first exemplary embodiment, and redundant illustrations are omitted here.

Above are embodiments of the present invention, which does not limit the scope of the present invention. Any modifications, equivalent replacements or improvements within the spirit and principles of the embodiment described above should be covered by the protected scope of the invention.

In contrast to the prior art, the present disclosure utilizes two inversed clock signals and the starting signal to control the charging time and discharging time of the GOA circuit. Furthermore, the present disclosure utilizes 3 or 4 addition clock signals to control the output of the gate driving signals. Therefore, the present invention merely utilizes 5 or 6 clock signals to achieve the same effect of a conventional GOA circuit. In other words, the present disclosure may reduce the number of clock signals used in the gate driver and reduce the power consumption of the GOA circuit.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A gate driver comprising a plurality of gate driver on array (GOA) units, each of the GOA units comprising:

a main driving circuit, comprising:

a first transistor, comprising a source, a drain, and a gate, wherein the source of the first transistor is configured to receive a starting signal and the gate of the first transistor is configured to receive a first triggering clock signal;

a second transistor, comprising a source, a drain, and a gate, wherein the gate of the second transistor is configured to receive a second triggering clock signal; and a third transistor, comprising a source, a drain, and a gate, wherein the main driving circuit has a first control node and a second control node and is configured to generate a charging signal on the first control node and generate a control signal on the second control node in response to the starting signal, the first triggering clock signal and the second clock signal;

a starting signal output circuit, comprising:

a fourth transistor, configured to receive the charging signal to output an intermediate signal; and a fifth transistor, configured to receive the control signal to deactivate the intermediate signal; and a plurality of gate driving circuits, each of the gate driving circuit comprising:

a sixth transistor, configured to receive the charging signal to output a gate driving signal; and a seventh transistor, configured to receive the control signal to deactivate the gate driving signal, wherein the main driving circuit further comprises an eighth transistor, a ninth transistor, and a tenth transistor, and wherein when the first transistor is turned on by the first triggering clock signal, the eighth transistor, the ninth transistor, and the tenth transistor are turned on such that the charging signal is generated on the first control node and the control signal is generated on the second control node.

2. The gate driver of claim 1, wherein the starting signal is another intermediate signal transferred from a GOA unit of a previous stage or a starting signal provided by a gate driving control chip.

3. The gate driver of claim 1, wherein the first triggering clock signal and the second triggering clock signal are inversed.

4. The gate driver of claim 1, wherein each of the sixth transistors of the gate driving circuits comprises a source, a drain, and a gate, wherein the sources of the sixth transistors are respectively electrically connected to different clock signals, the gates are electrically connected to the charging signal, and wherein the drains of the sixth transistors sequentially output a gate driving signal when the sixth transistors are turned on in response to the clock signals.

5. The gate driver of claim 4, wherein each of the seventh transistors of the gate driving circuits comprises a source, a drain, and a gate, wherein the sources of the seventh transistors are respectively electrically connected to the drains of the sixth transistors, the drains of the seventh transistors are electrically connected to a voltage source, the gates of the seventh transistors receive the control signal, and wherein the seventh transistors deactivate the gate driving signals by conducting the first voltage source when the seventh transistors are turned on in response to the control signal.

6. The gate driver of claim 1, wherein the fourth transistor of the starting signal output circuit comprises a source, a drain, and a gate, wherein the source of the fourth transistor is electrically connected to the second triggering clock signal, the gate of the fourth transistor receives the charging signal, and wherein when the fourth transistor is turned on by the second triggering clock signal, the drain of the fourth transistor outputs the starting signal.

7. The gate driver of claim 6, wherein the fifth transistor of the starting signal output circuit comprises a source, a drain, and a gate, the source of the fifth transistor is electrically connected to the drain of the fourth transistor, the drain of the fifth transistor is electrically connected to the first voltage source, and the gate of the fifth transistor receives the control signal, and wherein when the fifth transistor is turned on in response to the control signal, the fifth transistor stops generating the starting signal by conducting the first voltage source.

8. The gate driver of claim 1, wherein each of the GOA unit comprises a sequential-scan transistor and a reversed-scan transistor, respectively configured to receive a sequential-scan control signal and a reversed-scan control signal to control the GOA unit to operate in a sequential-scan mode or a reversed-scan mode.

9. A liquid crystal display comprising a gate driver, the gate driver comprising a plurality of gate driver on array (GOA) units, each of the GOA units comprising:

a main driving circuit, comprising:

a first transistor, comprising a source, a drain, and a gate, wherein the source of the first transistor is configured to receive a starting signal and the gate of the first transistor is configured to receive a first triggering clock signal;

a second transistor, comprising a source, a drain, and a gate, wherein the gate of the second transistor is configured to receive a second triggering clock signal; and a third transistor, comprising a source, a drain, and a gate, wherein the main driving circuit has a first control node and a second control node and is configured to generate a charging signal on the first control node and generate a control signal on the second control node in response to the starting signal, the first triggering clock signal and the second clock signal;

a starting signal output circuit, comprising:

a fourth transistor, configured to receive the charging signal to output an intermediate signal; and a fifth transistor, configured to receive the control signal to deactivate the intermediate signal; and a plurality of gate driving circuits, each of the gate driving circuit comprising:

a sixth transistor, configured to receive the charging signal to output a gate driving signal; and a seventh transistor, configured to receive the control signal to deactivate the gate driving signal, wherein the main driving circuit further comprises an eighth transistor, a ninth transistor, and a tenth transistor, and wherein when the first transistor is turned on by the first triggering clock signal, the eighth transistor, the ninth transistor, and the tenth transistor are turned on such that the charging signal is generated on the first control node and the control signal is generated on the second control node.

10. The liquid crystal display of claim 9, wherein the starting signal is another intermediate signal transferred from a GOA unit of a previous stage or a starting signal provided by a gate driving control chip.

11. The liquid crystal display of claim 9, wherein the first triggering clock signal and the second triggering clock signal are inversed.

12. The liquid crystal display of claim 9, wherein each of the sixth transistors of the gate driving circuits comprises a source, a drain, and a gate, wherein the sources of the sixth transistors are respectively electrically connected to different clock signals, the gates are electrically connected to the charging signal, and wherein the drains of the sixth transistors sequentially output a gate driving signal when the sixth transistors are turned on in response to the clock signals.

13. The liquid crystal display of claim 12, wherein each of the seventh transistors of the gate driving circuits comprises a source, a drain, and a gate, wherein the sources of the seventh transistors are respectively electrically connected to the drains of the sixth transistors, the drains of the seventh transistors are electrically connected to a voltage source, the gates of the seventh transistors receive the control signal, and wherein the seventh transistors deactivate the gate driving signals by conducting the first voltage source when the seventh transistors are turned on in response to the control signal.

14. The liquid crystal display of claim 9, wherein the fourth transistor of the starting signal output circuit comprises a source, a drain, and a gate, wherein the source of the fourth transistor is electrically connected to the second triggering clock signal, the gate of the fourth transistor receives the charging signal, and wherein when the fourth transistor is turned on by the second triggering clock signal, the drain of the fourth transistor outputs the starting signal.

15. The liquid crystal display of claim 14, wherein the fifth transistor of the starting signal output circuit comprises a source, a drain, and a gate, the source of the fifth transistor is electrically connected to the drain of the fourth transistor, the drain of the fifth transistor is electrically connected to the first voltage source, and the gate of the fifth transistor receives the control signal, and wherein when the fifth transistor is turned on in response to the control signal, the fifth transistor stops generating the starting signal by conducting the first voltage source.

16. The liquid crystal display of claim 9, wherein each of the GOA unit comprises a sequential-scan transistor and a reversed-scan transistor, respectively configured to receive a sequential-scan control signal and a reversed-scan control signal to control the GOA unit to operate in a sequential-scan mode or a reversed-scan mode.

* * * * *